May 13, 1930.  S. D. ANDERSON  1,757,990
CHECK WIRE GUIDE FOR CORN PLANTERS
Filed March 14, 1929  3 Sheets-Sheet 2
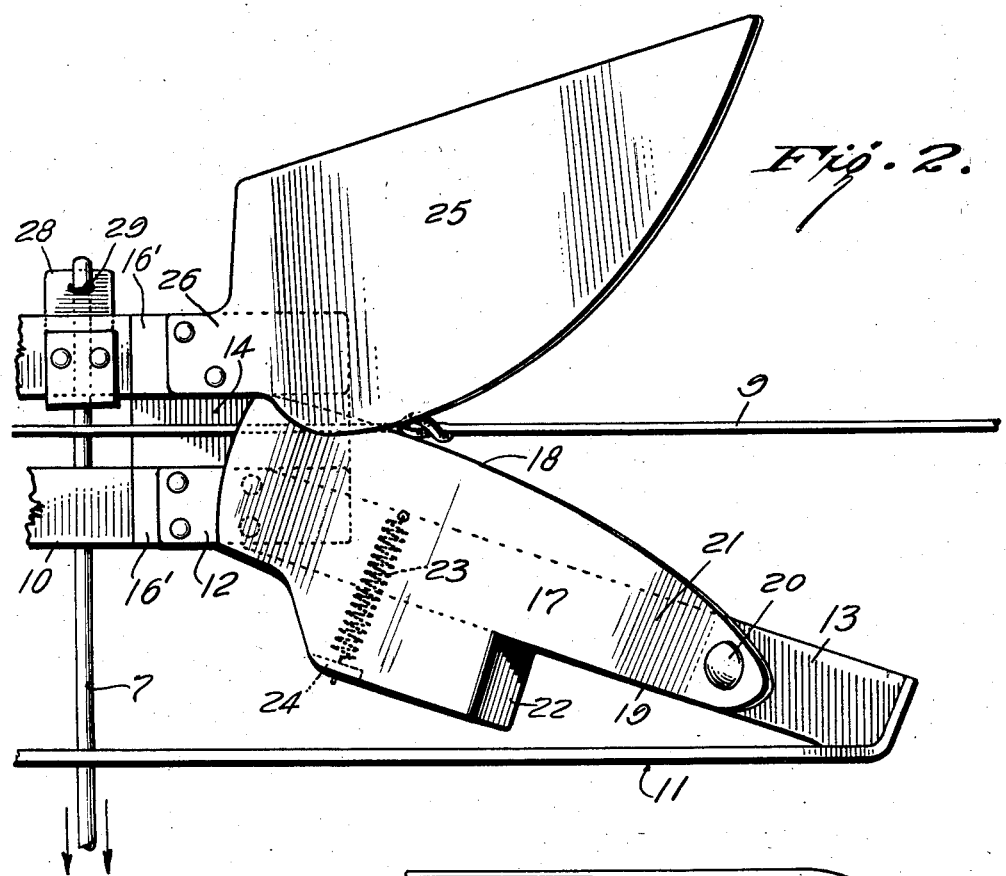
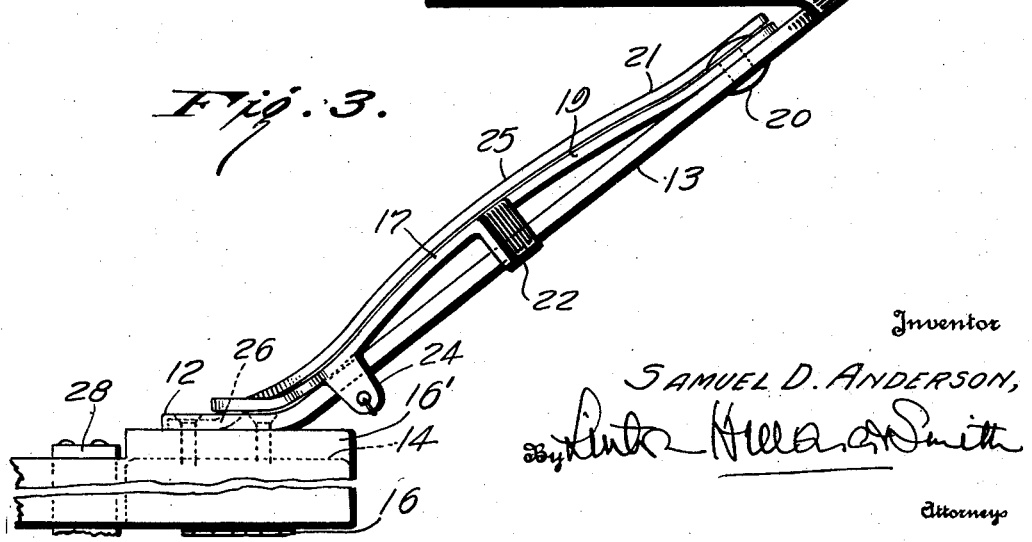
Inventor
SAMUEL D. ANDERSON,
Attorneys May 13, 1930.  S. D. ANDERSON  1,757,990
CHECK WIRE GUIDE FOR CORN PLANTERS
Filed March 14, 1929    3 Sheets-Sheet 3
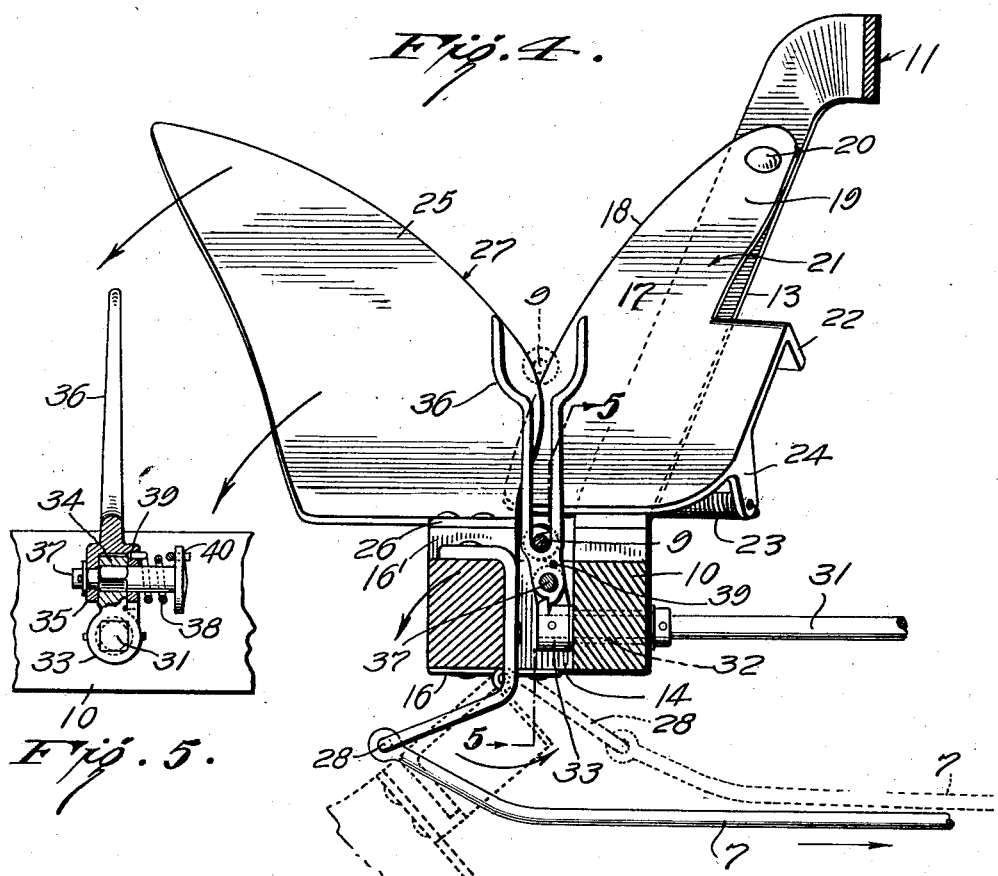
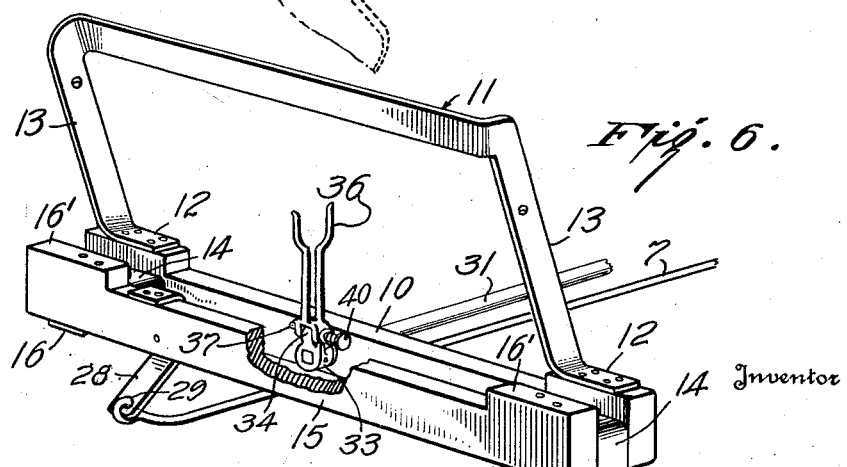
Inventor
SAMUEL D. ANDERSON Patented May 13, 1930

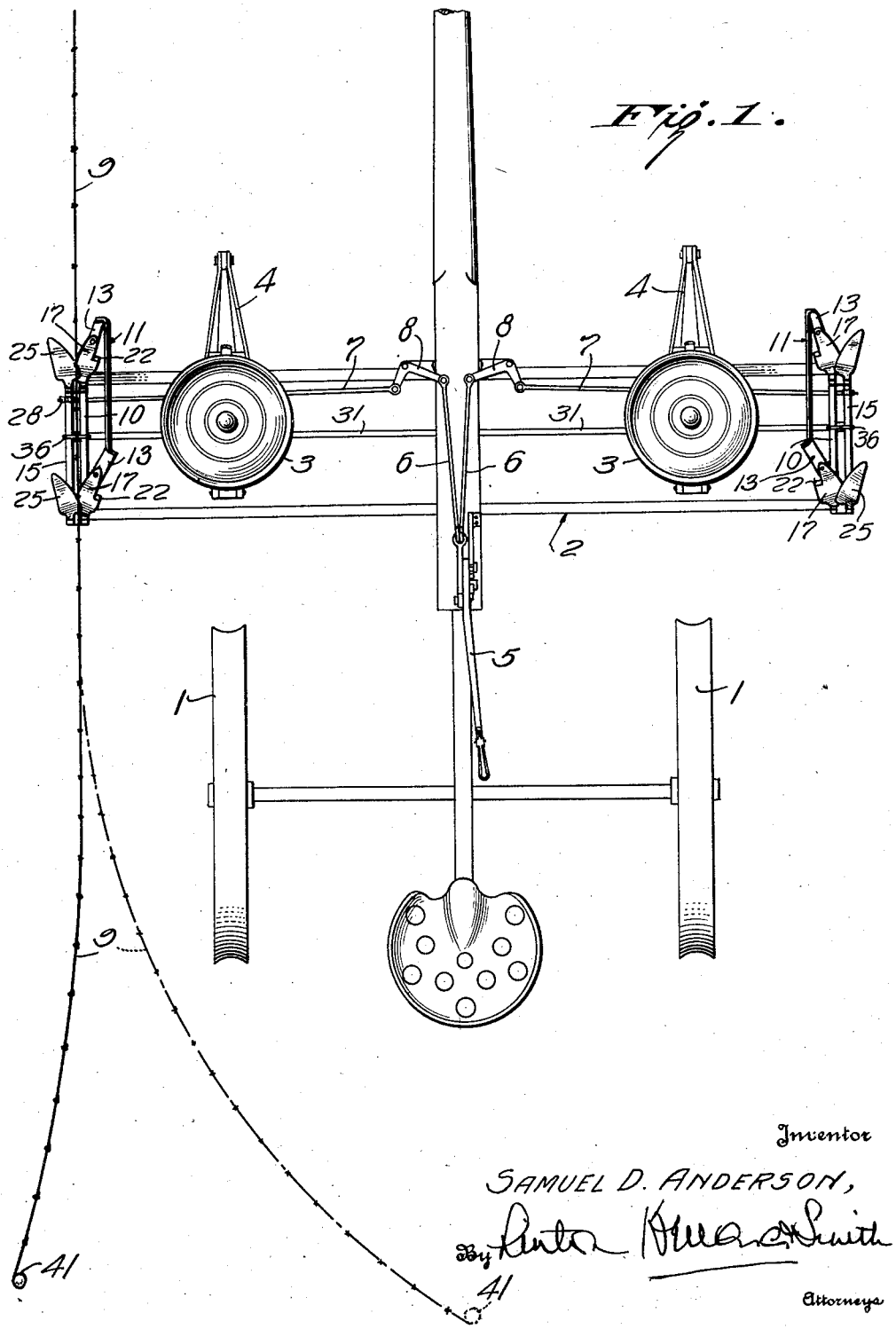

1,757,990

UNITED STATES PATENT OFFICE

SAMUEL D. ANDERSON, OF GRUNDY CENTER, IOWA

CHECK-WIRE GUIDE FOR CORN PLANTERS

Application filed March 14, 1929. Serial No. 347,013.

This invention relates to improvements in check row corn planters, having for an object to provide an attachment for the check wire or chain receiving and guide means of a corn planter, whereby said check chain or wire may be quickly and readily removed therefrom at the finish of a planted row and then repositioned upon the soil for a new row, whereupon, with an about turning of the planter, the repositioned chain or wire may be quickly and effectually re-engaged with the receiving and guide means and the planter, then started upon a newly marked course or row in a planting operation without disengagment or mispositioning of the check chain or wire, either at the time of the start of the new row planting or during the course or progress of the same.

Another and equally important object of the invention may be stated to reside in the provision of a device of the character mentioned, which will obviate the need of tediously threading or engaging and then disengaging the check chain or wire at the start and finish of every check planted row, the construction of the improved device being such, that the said check chain can be completely and positively disengaged from the check actuating mechanism of the planter by the planter operator at the finish of a planted row without leaving his seat upon the machine, whereupon, the check chain may be repositioned upon the soil for a new row, after which, it may be quickly and effectually re-engaged with said check actuating mechanism in a minimum amount of time and with labor much less than that heretofore required with the working of those devices now prevalent in the art.

Yet another object of the invention may be stated to reside in the provision of a check chain or wire receiving mechanism for corn planters, which, in addition to permitting the engaging and disengaging of a chain with and therefrom, will function to positively secure such chain from accidental or undue displacement and, also, ensure its retention in an effectual operating position, at all times.

Other objects of the invention will be in part obvious and in part pointed out hereinafter.

In order that the invention and its mode of operation may be readily understood by persons skilled in the art, I have in the accompanying illustrative drawings, and in the detailed following description based thereon, set out several possible embodiments of the same.

In these drawings:

Figure 1 is a top plan view of a corn planter equipped with the invention;

Figure 2 is an enlarged fragmentary top plan view showing the mounting of the guide arms of the invention;

Figure 3 is a fragmentary side elevation of one of these arms showing its pivotal mounting upon the supporting frame;

Figure 4 is a vertical transverse section through one of the improved guide means;

Figure 5 is a fragmentary detail in section taken on the line 5—5 of Figure 4, looking in the direction in which the arrows point; and Figure 6 is a detail in perspective and having a part thereof broken away, showing the construction of the supporting body and frame for the invention and the mounting of the check fork therein.

Having more particular reference to the drawings, in connection with which like characters of reference will designate corresponding parts throughout, it is to be understood that my improved check chain or wire receiving and guiding mechanism is especially adapted for use in connection with check row corn planters, wherein, 1 generally designates such a planter having a supporting frame 2 upon which corn or seed receiving and discharging or dropping receptacles 3 are mounted, together with the usual runners and earth working shoes 4; a hand lever 5 being suitably mounted in proximity to the frame 2 and connected through the medium of rods 6 and 7 and bell crank levers 8, to such runners and shoes; the rods 7 being provided with extensions, the purpose of which will be subsequently described.

The improved check chain or wire receiving devices constituting the present invention, are adapted to be arranged upon either side of the frame 1 as is shown in the Figure 1 of the accompanying drawings and as will be readily understood by workers skilled in this art, these particular devices or mechanisms are adapted for individual use, depending upon the direction of travel of the planter and the positioning of the check chain or wire 9 with respect to such planter during a planting operation. Therefore, in the following description, I will refer to but one of the improved chain receiving and guide mechanisms, it being understood that this description will suffice for the two mechanisms shown in connection with the Figure 1.

The improved check chain or wire receiving and guiding device or mechanism may be stated to comprise a supporting or body portion indicated herein by the numeral 10, adapted to be disposed transversely of the end portion of the planter frame 2, as is shown in the Figure 1; the opposite ends of this body 10 being formed to fixedly receive thereupon a frame or bracing structure of substantially U-shaped formation and indicated in its entirety by the numeral 11, the opposite extremities of this element 11 being formed with right angularly disposed feet 12 through which suitable fastening devices are passed into fixed engagement with the said opposite ends or extremities of the body 10. Also, in this connection, it will be noted that the opposite side portions of the frame 11 are arranged in inclined and relatively parallel relation and furthermore, are obliquely disposed with respect to the body portion 10, as is indicated by the numeral 13, this positioning or arrangement of said portions 13 being formed by either bending, twisting or folding said side portions 13 in their proper direction during the time of making of the frame 11.

The normally outer side of the body 10 is provided with check chain or wire supports or guides 14 adjacent the opposite extremities thereof and as will be noted, these elements 14 have their upper sides arranged in planes below the upper sides of the adjacent portions of said body 10 receiving them.

A supporting bar 15, approximately corresponding in shape and size to the body 10 is provided and is adapted to be hingedly mounted with respect to said body and adjacent to the outer sides or faces of the elements 14, through the medium of hinges 16, parts of which are secured to the lower side or marginal portion of said bar, while other parts of the hinges are fixedly secured to the adjacent and lower sides of the elements 14. The opposite ends of the bar 15 are enlarged or shouldered as is indicated by the numeral 16' and correspond in positioning and shape to the opposite ends of the body 10 to which the angularly disposed feet of the sides 13 of the frame 11 are secured.

Metal arms, indicated by the numeral 17 are provided adjacent each of the obliquely positioned sides of the frame 11 and as will be noted, these arms are formed with curved inner marginal portions 18, the normally upper extremities of said arms being reduced as at 19 and formed with pivot pin receiving openings, through which pivot pins 20 are passed and are effectually anchored in suitable openings provided therefor in said obliquely disposed sides 13 of the frame 11. Also, it is preferable that these arms 17 shall be transversely curved intermediately of their respective lengths, as is indicated by the numeral 21, whereby to ensure their free pivotal movement with respect to their particular receiving sides 13, aforesaid. To limit the inward pivotal movement of the arms 17 with respect to the sides 13 of the frame 11, I form the outer and intermediate portions thereof with substantially right angularly disposed fingers 22, so arranging these fingers that certain of the marginal portions of the same will have abutting engagement with the adjacent marginal portion of the respective sides 13 receiving them, that is, with outward pivotal movement of said arms. Also, to normally maintain the arms 17 in their outermost positions with respect to the sides 13 of the frame 11, I provide contractile coiled springs 23, connecting certain of the ends of the springs to the inner side portions and lower extremities of the sides 13, while the remaining ends of said springs are connected to the apertured extremities of fingers 24 carried upon the lower and outer marginal portion of each of the arms 17. Thus, it will be seen that the fingers 22, hereinbefore described, will be normally maintained in abutting engagement with the adjacent portions of the sides 13 of the frame 11, but that with the application of lateral stress to the inner and curved marginal portions 18 of said arms 17, these arms will be permitted to swing in inwardly directions, subject to return thereof to their normal positions through the medium of the springs 23 connected thereto and said sides 13.

Companion arms 25 are provided each of the arms 17, that is, these companion arms are paired with the pivotally mounted arms 17 and, as will be noted in the accompanying drawings, are of a size and shape generally approximating that of said arms 17. These companion arms 25 are fixedly mounted upon the enlarged or shouldered portions 16' of the bar 15 through the medium of suitable fastening devices passed through feet-like extensions 26 formed upon the lower extremities of the same. In this connection, it will be noted that the inner marginal portions of the arms 25, are curved as indicated by the numeral 27, thus providing a flaring-like space as between the same and the adjacent arm 17, while each of said companion arms 25 are preferably transversely curved upon themselves intermediately of their respective lengths.

It may be noted at this time, that the lower extremities or marginal portions of the paired arms 17 and 25 are disposed slightly above the body portions of the elements 10 and 11, the purpose of which will be subsequently apparent.

In order that pivotal movement may be imparted, at will of an operator of an equipped planter, to the bar 15, I secure to the intermediate and inner side portion of said bar an angle arm 28, said arm having its lower portion extended for a distance below the bar 15 and apertured to permit of loose engagement of the extension of the particularly adjacent rod 7 therewith, as indicated at 29. Thus, it will be understood that with working of the lever 5 to raise or lower the runners and shoes 4 of the planter, pivotal movement will be simultaneously imparted to the bar 15, causing it to be swung outwardly and away from the body 10 or upwardly and toward said body, depending, of course, upon the direction of movement or working of said lever 5. When the bar 15 is in its uppermost or operative position with respect to the body 10, it will be noted that the lower portions of the curved inner marginal parts 27 of the arms 25 will have a slight overlapping engagement with the adjacent portions of their particular arms 17, though, of course, said arms 17 are capable of being pivoted or swung in directions inwardly of or away from the arms 25. Also, in order that the bar 15 may be swung to a substantially perpendicular position with respect to the inner side or marginal portion of the body 11, I may and preferably do angle the lower portion of the arm 28, hence allowing the said bar to be swung to a position such as shown in Figure 4.

The check wire actuated seed or corn dropping shaft 31 of the adjacent seed or corn receiving receptacle 3 is passed through a bearing sleeve 32, mounted in a suitable opening provided therefor in an intermediate portion of the body 10 and carries upon its free end, a fixedly mounted collar 33 formed with an upwardly disposed bearing finger 34 which receives thereover, the bifurcated end 35 of the usual check fork 36; pivotal connection being effected between the finger 34 and the bifurcated bearing portion 35 of the check fork 36 by passing a pivot bolt 37 through the alined openings provided therefor in said elements 34 and 35; a portion of this bolt 37 carrying a coiled spring 38, one end of which is engaged, as at 39, to a portion of the bifurcated bearing 35, while the opposite end of such spring is fixed to the nut or head of said pivot bolt as at 40. Thus, it will be seen that pivotal movement of the check fork 36 will be permitted in a direction at substantially right angles to the collar 33 fixedly mounted upon the shaft 31 and consequently, that said check fork may swing outwardly, at times, with respect to the body 10, that is, when the bar 15 is swung outwardly and downwardly to its check chain or wire releasing position. The tension of the coiled spring 38, however, is sufficient to return the check fork 36 to its normal and upright position with the removal or disengagement of a check chain or wire therefrom.

In operation of my improved check chain or wire receiving guide means, the check chain or wire employed during the planting operation is properly arranged with respect to the soil or field to be planted with corn or other matter and, as is usual, the opposite ends of this chain or wire are staked or immovably secured to the soil through the medium of anchoring devices engaged therewith and indicated herein by the numeral 41. At this time, the planter operator properly positions the planter with respect to the chain or wire 9 and catching hold of a portion thereof, throws it upwardly and laterally in a manner to effect the dropping thereof into a position between the arms 17 and 25 of the improved mechanism. Because of the curvature of the inner marginal portions of these arms, as indicated by the numerals 18 and 27, it will be seen that the check chain or wire so introduced therebetween will be properly alined with the now upright or operatively positioned check fork 36, hence, causing the chain or wire to be positioned between the opposite side portions of the fork. The weight of the chain or wire causes it to move downwardly with respect to the curved marginal portions 18 and 27 of the arms 17 and 25 and during this downward movement, it will be understood that the arms 17 will be swung outwardly against the tension of their respective springs 23, thereby, permitting said wire to drop onto resting or supported position upon the upper sides of the elements 14 fixed to the body 10. Thus a supporting and guiding means will be provided for the check chain or wire, as the planter is subsequently moved over the course or marked row to be planted. Also, it will be understood that because of the pivotal spring mounting of the arms 17, said arms, with dropping of the check chain or wire 9 onto the supporting elements 14, will immediately return to their normal positions with respect to their companion arms 25 and consequently upon this, said check chain or wire will be effectually secured in position adjacent the elements 14 against accidental or undue displacement.

When the marked course or row has been planted or finished, it becomes necessary that the planter shall be turned about and moved in a return path of travel over the soil being planted whereby to plant a new row. At this time, the operator while seated upon the planter 1, rocks the hand lever 5 in a direction to cause the runners and shoes 4 to be disengaged from the soil and at the same time, to impart outward and downward pivotal movement to the bar 15 of the particular mechanism receiving the chain or wire 9. With this outward and downward swinging movement of the bar 15 with respect to the body 10, it will be understood that the lateral stressing of the wire together with its own weight, will cause the check fork 36 to be swung outwardly and downwardly, hence, discharging the check chain 9 therefrom and permitting it to freely drop onto the soil. With the chain or wire so disengaged from the receiving and guide mechanism, the operator now turns the planter about and so positions it that it will be ready for the planting of a new row. He also moves the anchoring devices 41 and replaces or repositions the check chain or wire 9 so as to mark off a new course or row to be planted upon his return travel over the soil or field. The bar 15 has been previously returned to its uppermost or operative position with respect to the body 10 by movement of the lever 5 in a direction reverse to that first described, this movement of the lever 5 causing the connecting rods 6 and 7 and the bell crank lever 8 engaging them, to transmit an outward thrust to the angle arm 28, thereby swinging the bar upon its hinged mounting 16 to said upright or operative position. Also, it will be understood that simultaneously with the movement of the arm 5 in a direction to return the bar 15 to its uppermost or operative position, the runners and soil working shoes 4 of the planter will be re-engaged with the soil. The now repositioned check chain or wire 9 is grasped by the operator and is swung upwardly and laterally so that it will drop into that space provided for the same between the curved marginal portions 18 and 27 of the arms 17 and 25; the chain moving downwardly to a resting position upon the elements 14 upon said body 10 and in so doing, moving the arms 17 outwardly against the tension of their respective coiled springs 23. With resting of the repositioned chain or wire 9 upon the elements 14, however, it will be understood that the pivotally mounted arms 17 will be immediately returned to their normal or overlapping positions with respect to their companion arms 25, under urge of their particular coiled springs 23 and consequently upon this, that the check chain or wire will be secured against accidental or undue displacement, as the planter is now driven over the field upon its return course for planting the new row as indicated by the repositioned check chain or wire 9.

Manifestly, the construction shown is capable of considerable modification, and such modification as is within the scope of my claims I consider within the spirit of my invention.

I claim:—

1. In a corn planter, check chain receiving, guiding and discharging means, comprising a body, a frame fixedly supported upon said body of substantially U-shaped formation having the opposite sides thereof forwardly inclined and disposed obliquely with respect to the longitudinal axis of said body, arms pivotally mounted on the opposite sides of said frame, a bar hinged to said body and parallel thereto, companion arms fixedly mounted on said bar and adapted to be normally positioned adjacent to and paired with said pivotal arms, a check fork positioned intermediately of the body and between said paired arms, said check fork being mounted for pivotal movement at substantially right angles to and away from said body, and means for imparting swinging movement to said bar, at times.

2. In a corn planter, check chain receiving, guiding and discharging means, comprising a body, a substantially U-shaped frame fixedly supported upon said body having the opposite sides thereof inclined and obliquely disposed with respect to the longitudinal axis of said body, arms pivotally mounted upon said sides of the U-shaped frame, a bar hinged to said body and parallel thereto, companion arms fixedly mounted on said bar and adapted to be normally positioned adjacent to and paired with said pivotal arms, the lower portions of said paired arms being arranged in overlapping relationship and spaced above the adjacent marginal portions of said body and said bar, a check fork mounted intermediately of said body between the paired arms adapted to have swinging movement at substantially right angles to said body and away from the same, and means for imparting swinging movement to said bar, at times.

3. In a corn planter, check chain receiving, guiding and discharging means, comprising a body, a substantially U-shaped frame fixedly mounted upon said body and disposed longitudinally thereof, arms pivotally mounted upon the opposite sides of said frame, a bar hinged to the body and parallel thereto, companion arms fixedly mounted on said bar and adapted to be normally positioned adjacent to and paired with said pivotal arms, the planter check fork being arranged between the paired arms and intermediately of said body, and means for imparting swinging movement to said bar, at times.

4. In a corn planter, check chain receiving, guiding and discharging means, comprising a body, arms pivotally mounted thereon, means engaging said arms for yieldably retaining the same in certain positions, a bar hinged to said body, companion arms fixedly mounted on said bar and adapted to be normally positioned adjacent to and paired with said pivotal arms, the lower portions of said paired arms being normally arranged in overlapping relationship and being spaced above said body and bar, the planter check fork being mounted upon the body intermediately of its ends and between said paired arms, and means for imparting swinging movement to said bar, at times.

5. In a corn planter, check chain receiving, guiding and discharging means, comprising a body, a substantially U-shaped frame fixedly mounted upon said body, arms pivotally mounted on the opposite sides of said frame, spring means engaging said arms and portions of their respective sides of said frame for normally receiving the arms in certain positions, a bar hinged to said body and parallel thereto, companion arms fixedly mounted on said bar and adapted to be normally positioned adjacent to and paired with said pivotal arms, chain receiving and guide means supported upon the body between the same and said bar, the lower portions of said paired arms being normally arranged in overlapping relationship and spaced above said receiving and guiding means on the body, a check fork mounted intermediately of said body between the same and said bar and between the paired arms, said check fork being adapted to have swinging movement at substantially right angles to and away from the body, at times, and means for imparting swinging movement to said bar, at times.

In witness whereof I have hereunto set my hand.

SAMUEL D. ANDERSON.